United States Patent [19]
Willcox et al.

[11] Patent Number: 5,378,747
[45] Date of Patent: Jan. 3, 1995

[54] ETHYLENE POLYMER COMPOSITIONS

[75] Inventors: Paritosh K. Das, Kenneth W. Wilcox; both of Bartlesville, Okla.

[73] Assignee: Phillips Petroleum Company, Bartlesville, Okla.

[21] Appl. No.: 997,976

[22] Filed: Dec. 28, 1992

[51] Int. Cl.$^6$ ............................................. C08K 5/527
[52] U.S. Cl. .................... 524/120; 524/320; 524/322; 524/377; 524/386; 524/385; 524/387
[58] Field of Search ............. 524/120, 320, 385, 386, 524/387, 377, 322; 538/78, 71

[56] References Cited

U.S. PATENT DOCUMENTS

| | | | |
|---|---|---|---|
| 2,956,983 | 10/1960 | Rindtorff et al. | 524/383 |
| 3,076,776 | 2/1963 | Findlay | 524/385 |
| 3,337,495 | 8/1967 | Corbett et al. | 524/343 |
| 3,493,537 | 2/1970 | Salyor et al. | 524/322 |
| 3,773,743 | 11/1973 | Ainsworth et al. | 524/96 |
| 3,901,859 | 8/1975 | ALberti et al. | 524/320 |
| 4,065,100 | 12/1977 | Hechenkleinkner | 558/78 |
| 4,116,926 | 9/1978 | York | 524/120 |
| 4,185,004 | 1/1980 | Mathis | 260/45.8 NT |
| 4,237,042 | 12/1980 | Stetanski | 524/120 |
| 4,362,831 | 12/1982 | Ohzeki et al. | 524/102 |
| 4,396,735 | 8/1983 | Minagawa et al. | 524/92 |
| 4,413,078 | 11/1983 | Lewis et al. | 524/120 |
| 4,419,473 | 12/1983 | Mahaffey | 524/120 |
| 4,504,615 | 3/1985 | Mills | 524/385 |
| 4,692,540 | 9/1987 | Illy et al. | 558/78 |
| 4,820,772 | 4/1989 | Goto et al.053790457 | 524/83 |
| 4,937,272 | 6/1990 | Sumitomo | 521/59 |
| 5,000,917 | 3/1991 | Willcox | 422/15 |
| 5,063,264 | 11/1991 | Nakajima | 524/118 |
| 5,066,460 | 11/1991 | Willcox | 422/7 |
| 5,070,129 | 12/1991 | Bailey | 524/399 |
| 5,102,611 | 4/1992 | Wolfe et al. | 264/568 |
| 5,103,035 | 4/1992 | Einagar et al. | 558/78 |
| 5,147,911 | 9/1992 | Hofmann et al. | 524/95 |
| 5,296,522 | 3/1994 | Vogt et al. | 524/320 |

OTHER PUBLICATIONS

G. J. Klender, Glass, Koloclchin and Schell–Antec 1985/86 Conference Proceedings, 989–997.

*Primary Examiner*—Veronica P. Hoke
*Attorney, Agent, or Firm*—Carl D. Corvin

[57] ABSTRACT

An ethylene polymer composition is provided that comprises:
(a) bis(2,4-di-tert-butylphenyl) pentaerythritol diphosphite, in an amount that is from about 0.0001 to less than 0.30 weight percent; and
(b) at least one color stabilization compound selected from the group consisting of:
  (1) a carboxylic acid compound;
  (2) an alcohol compound; and
  (3) a hydroxycarboxylic acid compound;
  in an amount from about 0.0001 to about 1 weight percent;

wherein said weight percents are based on the weight of said ethylene polymer composition.

29 Claims, No Drawings

ETHYLENE POLYMER COMPOSITIONS

BACKGROUND OF THE INVENTION

This invention is related to the field of ethylene homopolymer compositions and ethylene copolymer compositions.

Ultraviolet light has a wave length from about 10 to about 400 nanometers. Ultraviolet light tends to degrade a polymer composition into a less useful composition. However, ultraviolet light can be used to cure labels and certain types of printing inks on to polymer articles. One of the advantages of using ultraviolet light to cure these printing inks is that these printing inks contain very little solvent in their composition. This promotes the fast curing of these printing inks. Furthermore, this also minimizes the fire hazard that is usually associated with the more conventional solvent-based printing inks. However, more importantly, since there is very little solvent in these ultraviolet light-curable, printing inks, they pose less of an environmental hazard to the atmosphere than the more conventional solvent-based printing inks. This is because about 30 to about 60 wt. % of a conventional solvent-based printing ink evaporates into the atmosphere during processing.

Polymers can be protected from the harmful effects of ultraviolet light by compounding them with specially designed compositions. Usually these compositions are added to a polymer as part of an additive package. Those additive packages are often specifically designed for a particular polymer, in a particular polymer application, and in a particular polymer operating environment. However, forming these additive packages is a highly unpredictable area of polymer science and engineering.

SUMMARY OF THE INVENTION

It was recently discovered that bis(2,4-di-tert-butylphenyl) pentaerythritol diphosphite (which is a very effective secondary antioxidant used in many additive packages as a thermal stabilizer) would tend to turn a yellow-green color upon being subjected to intense ultraviolet light; yet, analogous compounds would not turn a yellow-green color upon being subjected to the same amount of intense ultraviolet light.

However, solving this discoloring problem is not as easy as merely substituting a non-color changing compound for bis(2,4-di-tert-butylphenyl) pentaerythritol diphosphite. This is because of the great expenditures of time and money that can be required for testing a new additive package. This is in addition to any requirements that any governmental agency might require. Consequently, it is best if the compounds that are used in a new additive package already have governmental approval. It is even better if the compounds used in the new additive package have a "good public image". That is, the public perceives the compounds as not being a hazard to the environment.

For the foregoing reasons, there is a need to form a new additive package that contains bis(2,4-di-tert-butylphenyl) pentaerythritol diphosphite. This new additive package, after it is compounded with a polymer composition, should minimize the yellow-green discoloration that is promoted by ultraviolet light.

It is an object of this invention to provide an ethylene homopolymer composition and an ethylene copolymer composition that resists turning a yellow-green color when subjected to ultraviolet light.

In accordance with this invention the ethylene homopolymer composition or ethylene copolymer composition comprises (or optionally consists essentially of, or consists of):

(a) bis(2,4-di-tert-butylphenyl) pentaerythritol diphosphite, in an amount that is from about 0.0001 but less than 0.30 weight percent; and
(b) at least one color stabilization compound selected from the group consisting of:
(1) a carboxylic acid compound;
(2) an alcohol compound; and
(3) a hydroxycarboxylic acid compound;
in an amount from about 0.0001 to about 1 wt. %; wherein said weight percents are based on the weight of the ethylene homopolymer or ethylene copolymer.

These and other features, aspects, objects, and advantages of this invention will become better understood with reference to the following detailed description of the invention and the claims.

DETAILED DESCRIPTION OF THE INVENTION

The ethylene homopolymer and the ethylene copolymer used in this invention can be produced by any method known in the art. Suitable examples of polymerization processes and polymerization catalysts can be found in the following U.S. patents: U.S. Pat. Nos. 3,152,872; 3,172,737; 3,203,766; 3,225,023; 3,226,205; 3,242,150; 3,248,179; 3,374,211; 3,622,521; and 3,622,522.

Ethylene can be copolymerized with any suitable olefin comonomer. However, it is preferably if the comonomer is a mono-1-olefin. Suitable examples of mono-1-olefins are propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, and 1-decene. Additionally, two or more olefins can be copolymerized with ethylene to form a copolymer. Particularly preferred as a comonomer is 1-hexene.

It is also preferable if the density of the ethylene homopolymer or ethylene copolymer composition is greater than 0.94 grams per cubic centimeter; additionally, it is also preferable if the melt index is greater than 0.1 grams per ten minutes. The density can be measured in accordance with ASTMD-1505 and the melt index can be measured in accordance with ASTMD-1238 (FR-190/2.16).

One component of the ethylene homopolymer composition or ethylene copolymer composition is bis(2,4-di-tert-butylphenyl) pentaerythritol diphosphite. This compound is commercially available from the GENERAL ELECTRIC CORPORATION under the tradename ULTRANOX 626. This compound has the following structure:

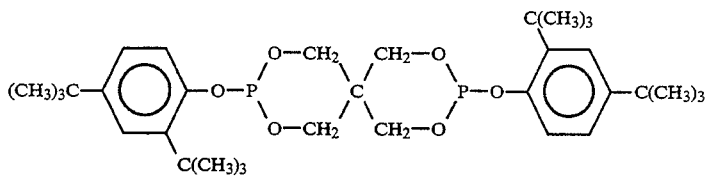

This compound is known as a secondary antioxidant. Secondary antioxidants are usually used in conjunction with primary antioxidants to increase the thermal stability and color stability of a polymer composition.

The amount of bis(2,4-di-tert-butylphenyl) pentaerythritol diphosphite to use in the ethylene homopolymer or ethylene copolymer composition is from about 0.0001 but less than 0.30 weight percent; it is preferably, however, if the amount used is from about 0.001 to about 0.025 weight percent. These weight percents are based on the weight of the ethylene homopolymer or ethylene copolymer.

Another component of the ethylene homopolymer or ethylene copolymer composition is a color stabilization compound. This compound can be selected from the group consisting of: (1) a carboxylic acid compound; (2) an alcohol compound; and (3) a hydroxycarboxylic acid compound. These compounds can be further described as follows.

The carboxylic acid compound can have from one to about 30 carbon atoms in its molecular structure. It is preferably if the carboxylic acid compound has an aliphatic molecular structure. That is, it is preferably if the carboxylic acid compound has a straight-chain molecular structure with a carboxylic acid group attached to one of the ends of the molecule. However, this carboxylic acid compound can have more than one carboxylic acid group. For the purposes of this specification these carboxylic acid compounds are defined as not having any hydroxy groups (—OH) attached to the carboxylic acid compound. Other functional groups and other atoms (besides the carbon, hydrogen, and oxygen already present) can be part of the molecular structure of the carboxylic acid compound, provided they do not substantially interfere with the functional capabilities of the carboxylic acid group(s) attached to the carboxylic acid compound. For example, the carboxylic acid compound could have an ether group present in its molecular structure. Suitable examples of carboxylic acid compounds are methanoic, ethanoic, propanoic, butanoic, pentanoic, hexanoic, heptanoic, octanoic, nonanoic, decanoic, dodecanoic, tetradecanoic, hexadecanoic, octadecanoic, ethanedioic, and propenoic. It is preferred if the carboxyllc acid compound is selected from the group consisting of saturated fatty acids that have from about 4 to about 22 carbon atoms; however, it is more preferred if the carboxylic acid compound is selected from the group consisting of dodecanoic, hexadecanoic, and octadecanoic. These particular carboxylic acid compounds are preferred because of their saturation and low volatility.

The alcohol compound can have from one to about 500 carbon atoms in its molecular structure. It is preferable if the alcohol has an aliphatic molecular structure. That is, it is preferable if the alcohol has a straight-chain molecular structure with an alcohol group attached to one of the ends of the molecule. However, this alcohol compound can have more than one alcohol group. For the purposes of this specification, these alcohol compounds are defined as not having any carboxylic acid groups (—COOH) attached to the alcohol compound. Other functional groups and other atoms (besides the carbon, hydrogen, and oxygen already present) can be part of the molecular structure of the alcohol compound, provided they do not substantially interfere with the functional capabilities of the alcohol group(s) attached to the alcohol compound. For example, the alcohol compound could also have an ether group present in its molecular structure. Suitable examples of alcohol compounds are methanol, ethanol, propanol, butanol, pentanol, hexanol, heptanol, octanol, nonanol, decanol, dodecanol, tetradecanol, hexadecanol, octadecanol, ethanediol, polyethylene glycol, and methoxypolyethylene glycol. It is preferred if the alcohol compound is selected from the group consisting of saturated alcohol compounds that have from about 5 to about 50 carbon atoms; however, it is more preferred if the alcohol compound is selected from the group consisting of polyethylene glycol and methoxypolyethylene glycol. These particular alcohol compounds are preferred because of their saturation and low volatility.

The hydroxycarboxylic acid compound can have from one to about 30 carbon atoms in its molecular structure. It is preferably if the hydroxycarboxylic acid compound has an aliphatic molecular structure. That is, it is preferable if the hydroxycarboxylic acid compound has a straight-chain molecular structure. However, this hydroxycarboxylic acid compound can have more than one alcohol group and more than one carboxylic acid group. Other functional groups and other atoms (besides the carbon, hydrogen, and oxygen already present) can be part of the molecular structure of the hydroxycarboxylic acid compound, provided they do not substantially interfere with the functional capabilities of the alcohol group(s) or the carboxylic acid group(s) attached to the hydroxycarboxylic acid compound. For example, the hydroxycarbolic acid compound could also have an ether group present in its molecular structure. Suitable examples of hydroxycarboxylic acid compounds are hydroxyethanoic, 2-hydroxypropanoic, hydroxybutanoic, 2,3-dihydroxypropanoic, hydroxypropanoic, hydroxybutanoic 2,3-dihydroxypropanoic, hydroxypropanedioic, hydroxybutanedioic, 2,3-dihydroxybutanedioic, and 2-hydroxy-1,2,3-propane tricarboxylic acid. It is preferred if the hydroxycarboxylic acid compound is selected from the group consisting of those hydroxycarboxylic acid compounds that have at least one hydroxy group and one carboxylic acid group attached to the same carbon atom. This particular structure is preferred because of the unique molecular orbital interactions that occur between these atoms. It is also preferred if the hydroxycarboxylic acid compound is 2-hydroxy-1,2,3-propane tricarboxylic acid. This particular hydroxycarboxylic acid compound is preferred because of its surprising and unexpected effectiveness and because it is also known as citric acid which has a "good public image".

The amount of color stabilization compound to us in the ethylene homopolymer or ethylene copolymer composition is from about 0.0001 to about 1 wt. %; it is preferably, however, if the amount used is from about 0.0005 to about 0.6 wt. %; and it is most preferable that the amount used is from 0.001 to 0.4 weight percent. These weight percents are based on the weight of the ethylene homopolymer or ethylene copolymer. However, it should be noted that certain particular color stabilization compounds are so unexpectedly and surprisingly effective that very little needs to be used in order to minimize the discoloration to an acceptable level. For example, when using citric acid an amount from about 0.001 to about 0.1 could be used.

The ethylene homopolymer and/or ethylene copolymer can be blended with bis(2,4-di-tert-butylphenyl) pentaerythritol diphosphite and the color stabilization compound in any manner known in the art. For example, they can be dry blended in a mixer or wet blended in a mixer. However, it is preferable if these components are extruded to thoroughly and intimately blend the components.

Other components can also be blended with the ethylene homopolymer and/or ethylene copolymer composition. For example, antifogging agents, antimicrobial agents, coupling agents, flame retardants, foaming agents, fragrances, lubricant, mold release agents, organic peroxides, smoke suppressants, and heat stabilizers. Further information on these compounds can be found in MODERN PLASTICS ENCYCLOPEDIA, 1992, pages 143-198.

EXAMPLE

This example is provided to assist a person skilled in the art with understanding this invention. This example is intended to be illustrative of the invention and is not meant to be construed as limiting the scope of the invention.

Each indicated component in each run in Table E-1 was dry blended together for about two minutes. Thereafter the ethylene copolymer composition is extruded in a twin screw extruder that had four separate temperature zones. Zone one was at 190° C., zone two was at 210° C., zone three was at 220° C., and zone 4 was at 215° C. The extruder screws rotated at 25 revolutions per minute. After extruding the ethylene copolymer composition each strand was pelletized and placed in a sample carton.

Each filled sample carton was then analyzed by a HUNTER LAB D25 OPTICAL SENSOR that was purchased from HUNTER ASSOCIATE LABORATORY, INC. This analysis provided the initial HUNTER "a" and HUNTER "b" values (IA and IB in Table E-1). A negative HUNTER "a" value indicates that the sample tends to be green. The more negative the value the more intense the green color is in the sample. A positive HUNTER "a" value indicates that the sample tends to be red. The more negative the value the more intense the red color is in the sample. Likewise, a negative HUNTER "b" value indicates that the sample tends to be blue. The more negative the value the more intense the blue color is in the simple. A positive HUNTER "b" value indicates that the sample tends to be yellow. The more positive the value the more intense the yellow color is in the sample. Consequently, each sample can have two HUNTER values, a green-red value and a blue-yellow value.

After each sample was analyzed for its initial HUNTER values, it was subjected to ultraviolet light. This ultraviolet light was delivered by a UVS-54 SIX WATT SHORT-WAVE LENGTH (254 NANOMETERS) 115 VOLTS HAND HELD MINERAL LIGHT that was purchased from FLUORESCENT MINERALS COMPANY. This mineral light produced a broad band of ultraviolet light with a maximum intensity at 254 nanometers. This mineral light delivered 140 microwatts of energy per square-centimeter at a wave length of 310 nanometers. Each sample was subjected to this ultraviolet light for two minutes. Thereafter, each sample was again analyzed by the HUNTER LAB D25 OPTICAL SENSOR for the HUNTER "a" and HUNTER "b" values. This analysis provided the final HUNTER "a" and HUNTER "b" values (FA and FB in Table E-1).

TABLE E-1

| Run No. | PA[1] | PB[2] | IX[3] | UX[4] | SA[5] | CA[6] | CW[7] | IA[8] | IB[9] | IC[10] | FA[11] | FB[12] | FC[13] | CC[14] |
|---|---|---|---|---|---|---|---|---|---|---|---|---|---|---|
| 1 | 100 | — | 0.042 | — | — | — | — | −2.20 | 1.25 | 2.53 | −2.54 | 2.41 | 3.50 | 1.21 |
| 2 | 100 | — | 0.042 | 0.021 | — | — | — | −1.90 | −0.64 | 2.01 | −9.44 | 13.10 | 16.15 | 15.67 |
| 3 | 100 | — | 0.042 | 0.042 | — | — | — | −1.91 | −0.98 | 2.15 | −14.27 | 22.64 | 26.76 | 26.66 |
| 4 | 100 | — | 0.042 | 0.021 | — | — | 0.025 | −1.83 | −1.20 | 2.19 | −6.32 | 7.04 | 9.46 | 9.38 |
| 5 | 100 | — | 0.042 | 0.021 | — | 0.01 | — | −1.70 | 0.09 | 1.70 | −2.38 | −0.89 | 2.54 | 1.19 |
| 6 | 100 | — | 0.30 | 0.02 | — | — | — | −1.75 | 0.39 | 1.79 | −10.30 | 14.48 | 17.77 | 16.48 |
| 7 | 100 | — | 0.30 | 0.02 | — | — | — | −1.72 | −0.19 | 1.73 | −9.04 | 12.03 | 15.05 | 14.24 |
| 8 | 100 | — | 0.30 | 0.02 | 0.05 | — | — | −1.73 | −0.42 | 1.78 | −8.70 | 10.90 | 13.95 | 13.29 |
| 9 | 100 | — | 0.30 | 0.02 | 0.05 | — | — | −1.64 | −0.78 | 1.82 | −6.32 | 6.61 | 9.15 | 8.75 |
| 10 | 100 | — | 0.30 | 0.02 | 0.10 | — | — | −1.60 | −0.80 | 1.79 | −6.30 | 6.39 | 8.97 | 8.59 |
| 11 | 100 | — | 0.30 | 0.02 | 0.20 | — | — | −1.67 | −0.85 | 1.87 | −5.25 | 4.42 | 6.86 | 6.37 |
| 12 | 100 | — | 0.30 | 0.02 | 0.40 | — | — | −1.72 | −0.84 | 1.91 | −3.87 | 2.52 | 4.62 | 3.99 |
| 13 | 100 | — | 0.30 | 0.015 | — | — | — | −1.61 | −0.10 | 1.61 | −6.70 | 7.94 | 10.39 | 9.52 |
| 14 | 100 | — | 0.30 | 0.015 | 0.10 | — | — | −1.69 | −0.60 | 1.79 | 2.64 | 0.73 | 2.74 | 1.63 |
| 15 | 100 | — | 0.30 | 0.010 | — | — | — | −1.79 | 0.19 | 1.80 | −4.90 | 4.89 | 6.92 | 5.64 |
| 16 | 100 | — | 0.30 | 0.010 | 0.10 | — | — | −1.61 | −0.82 | 1.81 | −2.36 | 0.21 | 2.37 | 1.27 |
| 17 | 100 | — | 0.30 | 0.0075 | — | — | — | −1.76 | 0.32 | 1.79 | −3.70 | 3.17 | 4.87 | 3.47 |
| 18 | 100 | — | 0.30 | 0.0075 | 0.10 | — | — | −1.68 | −0.89 | 1.90 | −2.15 | −0.20 | 2.16 | 0.84 |
| 19 | — | 100 | — | — | — | — | — | −1.41 | 2.09 | 2.52 | −1.38 | 1.50 | 2.03 | 0.59 |
| 20 | — | 100 | 0.30 | 0.02 | — | — | — | −1.16 | 0.14 | 1.17 | −6.55 | 8.87 | 11.02 | 10.26 |
| 21 | — | 100 | 0.30 | 0.02 | 0.10 | — | — | −1.12 | −0.30 | 1.16 | −3.61 | 3.60 | 5.10 | 4.63 |
| 22 | — | 100 | 0.30 | 0.015 | 0.10 | — | — | −1.30 | 2.39 | 2.72 | −1.30 | 1.64 | 2.09 | 0.75 |
| 23 | — | 100 | 0.30 | 0.010 | 0.10 | — | — | −1.33 | 2.33 | 2.68 | −1.35 | 1.53 | 2.04 | 0.80 |
| 24 | — | 100 | 0.30 | 0.0075 | 0.10 | — | — | −1.36 | 2.37 | 2.73 | −1.32 | 1.56 | 2.04 | 0.81 |
| 25 | — | 100 | 0.30 | 0.02 | — | 0.01 | — | −1.06 | −0.73 | 1.29 | −1.79 | 0.06 | 1.79 | 1.04 |

TABLE E-1-continued

| Run No. | PA[1] | PB[2] | IX[3] | UX[4] | SA[5] | CA[6] | CW[7] | IA[8] | IB[9] | IC[10] | FA[11] | FB[12] | FC[13] | CC[14] |
|---|---|---|---|---|---|---|---|---|---|---|---|---|---|---|
| 26 | — | 100 | 0.30 | 0.02 | — | 0.01 | — | −1.00 | 0.33 | 1.05 | −7.81 | 11.51 | 13.91 | 13.09 |

[1] This is the amount of ethylene copolymer "A" in parts by weight. This ethylene copolymer used 1-hexene as a comonomer. It had a density in the range of 0.953 to 0.956 grams per cubic centimeter as measured in accordance with ASTMD-1505-85. It also had a melt index in the range of 0.3 to 0.4 grams per cubic centimeter as measured in accordance with ASTMD-1238-65T (FR-190/2.16).
[2] This is the amount of ethylene copolymer "B" in parts by weight. This ethylene copolymer used 1-hexene as a comonomer. It had a density in the range of 0.960 to 0.963 grams per cubic centimeter as measured in accordance with ASTMD-1505-85. It also had a melt index in the range of 5.5 to 7.5 grams per cubic centimeter as measured in accordance with ASTMD-1238-65T (FR-190/2.16).
[3] This is the amount of octadecyl 3-(3′,5′-di-tert-butyl-4′-hydroxyphenyl) propionate in parts by weight. This compound is a primary antioxidant that is also known as IRGANOX 1076. This compound is available from the CIBA-GEIGY CORPORATION.
[4] This is the amount of bis(2,4-di-tert-butylphenyl) pentaerythritol diphosphite in parts by weight.
[5] This is the amount of octadecanoic in parts by weight.
[6] This is the amount of 2-hydroxy-1,2,3-propane tricarboxylic acid (also known as citric acid) in parts by weight. However, run 26 is the sodium salt of this acid.
[7] This is the amount of CARBOWAX 400 in parts by weight. This composition comprises polyethylene glycol and methoxypolyethylene glycol. This composition is available from the UNION CARBIDE CORPORATION.
[8] This is the initial HUNTER "a" value.
[9] This is the initial HUNTER "b" value.
[10] This is the relative initial color value. It is defined as $[(IA)^2 + (IB)^2]^{\frac{1}{2}}$, for the purposes of this specification.
[11] This is the final HUNTER "a" value.
[12] This is the final HUNTER "b" value.
[13] This is the relative final color value. It is defined as $[(FA)^2 + (FB)^2]^{\frac{1}{2}}$, for the purposes of this specification.
[14] This is the relative change in the initial and final color value. It is defined as $[(FA-IA)^2 + (FB-IB)^2]^{\frac{1}{2}}$, for the purposes of this specification.

The following can be discerned from the results. Runs 1–3, 6–7, 13, 15, 17, and 19 indicate that bis(2,4-di-tert-butylphenyl) pentaerythritol diphosphite is responsible for the yellow-green discoloration problem. Runs 8–12, 14, 16, 18, and 21–24 indicate that octadecanoic (which is a saturated fatty acid) minimizes the discoloration problem. For example, in comparing Runs 6–7 with Run 12, it is apparent that the addition of octadecanoic reduced the discoloration problem by about 75 percent. Comparing Run 4 with Run 8 it is apparent that CARBOWAX 400 is more effective than octadecanoic by about 30 percent even though the amount of CARBOWAX 400 used was about 50 percent less than the amount of octadecanoic used. It should be noted that Run 9 is considered to be an anomalous run in that it is not in keeping with the results obtained for Runs 8–12. Comparing Runs 5 and 25 with Run 8 it is apparent that citric acid is more effective than octadecanoic by about 90 percent even though the amount of citric acid used was about eighty percent less than the amount of octadecanoic used. Additionally, comparing Run 26 to Runs 20 and 25 it should be noted that a sodium salt of citric acid did not work as well.

Although the present invention has been described in detail with reference to certain preferred versions thereof, other versions are possible. Therefore, the spirit and scope of the appended claims should not be limited to the description of the preferred version contained herein.

For the purposes of this specification the term "ethylene polymer" shall mean both an ethylene homopolymer and ethylene copolymer.

That which is claimed is:

1. An ethylene polymer composition that comprises:
   (a) bis(2,4-di-tert-butylphenyl) pentaerythritol diphosphite, in an amount that is from about 0.0001 to less than 0.30 weight percent; and
   (b) at least one color stabilization compound selected from the group consisting of:
      (1) a carboxylic acid compound;
      (2) an alcohol compound that has an aliphatic molecular structure; and
      (3) a hydroxycarboxylic acid compound;
      in an amount from about 0.0001 to about 1 weight percent
   wherein said weight percents are based on the weight of said ethylene polymer.

2. A composition according to claim 1 wherein said ethylene polymer is a copolymer.

3. A composition according to claim 2 wherein said copolymer has a mono-1-olefin as a comonomer.

4. A composition according to claim 3 wherein said comonomer is selected from the group consisting of propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene and mixtures of two or more said comonomers.

5. A composition according to claim 3 wherein said comonomer is 1-hexene.

6. A composition according to claim 1 wherein said ethylene polymer has a density greater than 0.94 grams per cubic centimeter and a melt index greater than 0.1 grams per ten minutes.

7. A composition according to claim 1 where the amount of said bis(2,4-di-tert-butylphenyl) pentaerythritol diphosphite is from about 0.001 to about 0.025 weight percent based on the weight of said ethylene polymer.

8. A composition according to claim 1 wherein said color stabilization compound is a carboxylic acid compound.

9. A composition according to claim 8 wherein said carboxylic acid compound has from one to about thirty carbon atoms in its molecular structure.

10. A composition according to claim 8 wherein said carboxylic acid compound has an aliphatic molecular structure.

11. A composition according to claim 8 wherein said carboxylic acid compound is selected from the group consisting of methanoic, ethanoic, propanoic, butanoic, pentanoic, hexanoic, heptanoic, octanoic, nonanoic, decanoic, dodocanoic, tetradecanoic, hexadecanoic, octadecanoic, ethanedioic, propenoic and mixtures of two or more of said carboxylic acid compounds.

12. A composition according to claim 8 wherein carboxylic acid compound is a saturated fatty acid that has from about 4 to about 22 carbon atoms.

13. A composition according to claim 8 wherein said carboxylic acid compound is selected from the group consisting of dodecanoic, hexadecanoic, octadecanoic and mixtures of two or more said carboxylic acid compounds.

14. A composition according to claim 8 wherein carboxylic acid compound is octadocanoic.

15. A composition according to claim 1 wherein said color stabilization compound is an alcohol compound that has an aliphatic molecular structure.

16. A composition according to claim 15 wherein said alcohol compound has from one to about 500 carbon atoms in its molecular structure.

17. A composition according to claim 15 wherein said alcohol compound has a straight-chain molecular structure with an alcohol group attached to one of the ends of the molecule.

18. A composition according to claim 15 wherein said alcohol compound is selected from the group consisting of methanol, ethanol, propanol, butanol, pentanol, hexanol, heptanol, octanol, nonanol decanol, dodecanol, tetradecanol, hexadecanol, octadecanol, ethanediol, polyethylene glycol, and methoxypolyethylene glycol and mixtures of two or more of said alcohol compounds.

19. A composition according to claim 15 wherein said alcohol compound is a saturated alcohol that has from about 5 to about 50 carbon atoms.

20. A composition according to claim 15 wherein said alcohol compound is selected from the group consisting of polyethylene glycol, methoxypolyethylene glycol and mixtures of these alcohol compounds.

21. A composition according to claim 1 wherein said color stabilization compound is a hydroxycarboxylic acid compound.

22. A composition according to claim 21 wherein said hydroxycarboxylic acid has from one to about thirty carbon atoms in its molecular structure.

23. A composition according to claim 21 wherein said hydroxycarboxylic acid compound has an aliphatic molecular structure.

24. A composition according to claim 21 wherein said hydroxycarboxylic acid is selected from the group consisting of hydroxyethanoic, 2-hydroxypropanoic, hydroxybutanoic, 2,3-dihydroxypropanoic, hydroxypropanedioic, hydroxybutanedioic, 2,3-dihydroxybutanedioic, 2-hydroxy-1,2,3-propane tricarboxylic acid and mixtures of two or more said hydroxycarboxylic acids.

25. A composition according to claim 21 wherein said hydroxycarboxylic acid has at least one hydroxy group and one carboxylic acid group attached to the same carbon.

26. A composition according to claim 21 wherein said hydroxycarboxylic acid is 2-hydroxy-1,2,3-propane tricarboxylic acid.

27. A composition according to claim 1 wherein the amount of said color stabilization compound is from about 0.0005 to about 0.6 weight percent based on the weight of the ethylene polymer.

28. A composition according to claim 1 wherein the amount of said color stabilization agent is from 0.001 to 0.4 weight percent based on the weight of the ethylene polymer.

29. A ethylene copolymer composition that consists essentially of:
   (a) bis(2,4-di-tert-butylphenyl) pentaerythritol diphosphite, in an amount that is from about 0.0001 to about 0.025 with percent; and
   (b) a color stabilization compound that is 2-hydroxy-1,2,3-propane tricarboxylic acid, in an amount from about 0.001 to about 0.1 weight percent;
wherein said weight percents are based on the weight of said ethylene copolymer.

* * * * *

UNITED STATES PATENT AND TRADEMARK OFFICE
CERTIFICATE OF CORRECTION

PATENT NO. : 5,378,747

DATED : January 3, 1995

INVENTOR(S) : Paritosh K. Das and Kenneth W. Wilcox

It is certified that error appears in the above-identified patent and that said Letters Patent is hereby corrected as shown below:

Column 8, line 56, "dodocanoic" should read ---dodecanoic---.

Column 8, line 67, after "wherein" insert ---said---.

Column 8, line 68, "octadocanoic" should read ---octadecanoic---.

Signed and Sealed this

Thirtieth Day of January, 1996

Attest:

BRUCE LEHMAN

Attesting Officer

Commissioner of Patents and Trademarks